March 27, 1956
S. MALINIAK
2,739,466
STAND FOR SUPPORTING THE UPPER BOWL
OF A VACUUM TYPE COFFEE MAKER
Filed Jan. 6, 1954
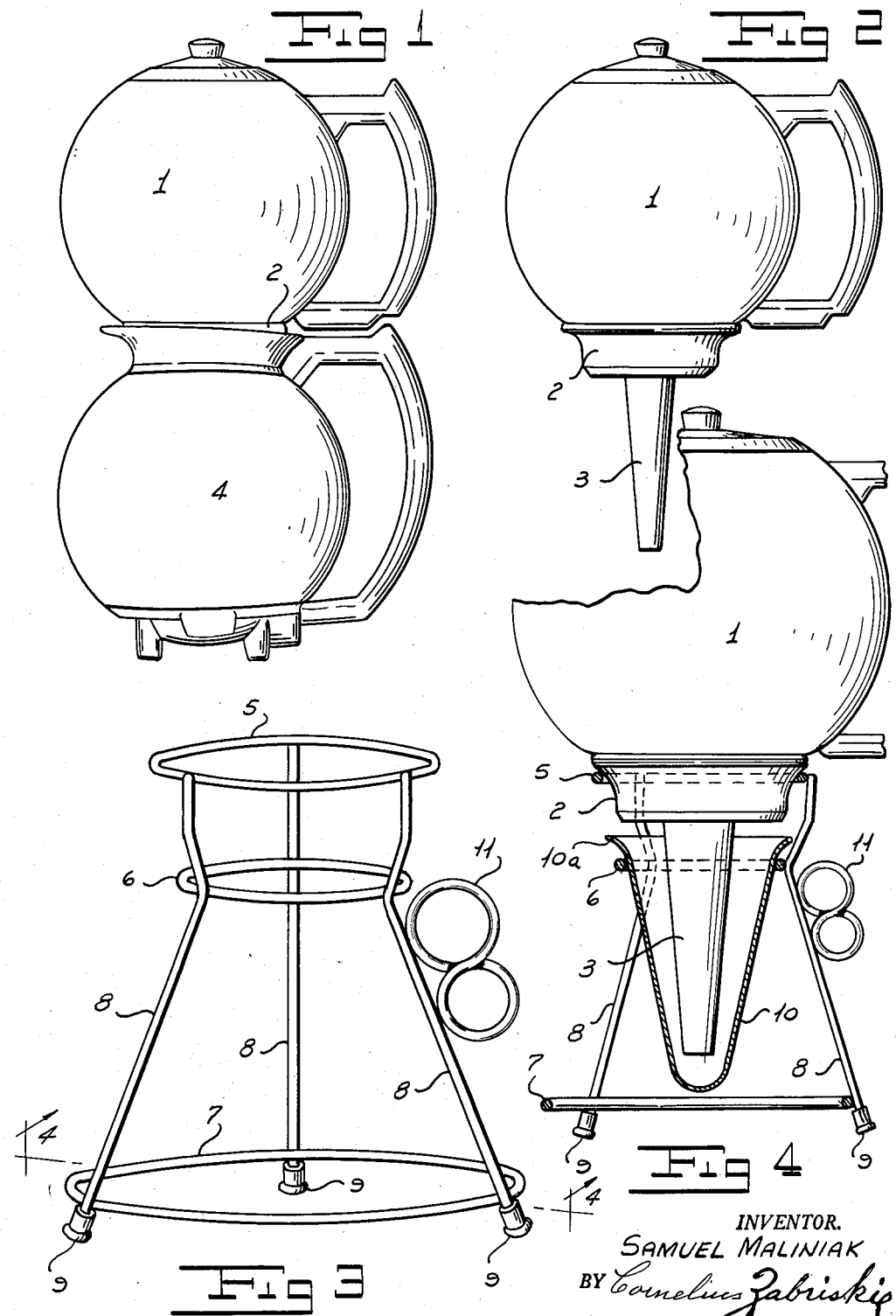
INVENTOR.
SAMUEL MALINIAK
BY Cornelius Zabriskie
ATTORNEY

United States Patent Office 2,739,466
Patented Mar. 27, 1956

2,739,466
STAND FOR SUPPORTING THE UPPER BOWL OF A VACUUM TYPE COFFEE MAKER

Samuel Maliniak, North Bergen, N. J.

Application January 6, 1954, Serial No. 402,493

1 Claim. (Cl. 65—65)

This invention is an accessory for use in connection with coffee makers of the vacuum type. Such coffee makers, generally electric in character, comprise a lower bowl and an upper bowl, commonly constructed from Pyrex glass. The upper bowl is provided at its bottom with an outlet to which is secured a depending brew tube of frusto conical form normally secured to the upper bowl by a rubber gasket. This gasket detachably seats within an opening in the top of the lower bowl to form a substantially pressure tight joint therewith.

The ground coffee to be brewed is placed in the upper bowl, while an appropriate amount of water is placed in the lower bowl. The lower bowl is then heated and the steam pressure generated therein forces the water upwardly through the brew tube into the upper bowl where the brewing of the coffee takes place. After the water has passed into the upper bowl, the pressure in the lower bowl is relieved and the liquid coffee brew thereupon gravitates from the upper bowl into the lower bowl through a filter associated with the gasket.

After the brew has descended into the lower bowl and the resulting coffee is ready to be served, the upper bowl, with its attached gasket and brew tube are removed from the lower bowl and laid aside, the coffee being served directly from the lower bowl after the manner of service from a pitcher.

When the upper bowl is removed as stated, it contains the wet coffee grounds and is in a heated condition. If laid upon a table top some of the liquid remaining in the upper bowl will seep out through the brew tube and spread over the table surface while the heat of the upper bowl is sufficient to damage or blister highly finished surfaces. It has consequently been the practice, when removing the upper bowl, to lay it upon a dinner plate or platter sufficiently large to properly support it. This latter practice is undesirable for many reasons, among which may be mentioned the following. If the coffee is brewed at the dinner table, the laying aside of the upper bowl upon a plate produces an unsightly appearance and crowds the table top. For this reason tidy hostesses will leave the table and remove the upper bowl to the kitchen. Furthermore unless care is taken in depositing the upper bowl upon a plate, it is apt to be struck against the plate with sufficient force to crack or break it.

The object of the present invention is to overcome these disadvantages in the use of coffee makers of the character described through the provision of a novel, efficient and aesthetic stand adapted to receive and support the upper bowl when removed from the lower bowl, as stated.

The stand of the present invention is preferably constructed from wire or wire rod. It embodies, generally speaking, two annular rings spaced one above the other and supported from any flat horizontal surface by legs. The upper ring is made of a size to receive and support the gasket of the upper brew bowl, while the lower ring supports a subjacent liquid impervious container which is preferably of substantially conical form to receive the brew tube of the upper bowl, whereby any liquid which may seep therefrom will be retained within the receptacle. A suitable handle is associated with the stand, so that it may be readily grasped without contact between the fingers and the heated bowl.

The device of this invention may be economically manufactured, is pleasing in appearance and thoroughly efficient in the carrying out of its intended purposes.

Features of the invention, other than those adverted to, will be apparent from the hereinafter detailed description and appended claim when read in conjunction with the accompanying drawing.

The accompanying drawing illustrates one practical embodiment of the invention, but the construction therein shown is to be understood as illustrative, only, and not as defining the limits of the invention.

Fig. 1 is a side elevation illustrating the type of coffee maker in connection with which the stand of the present invention is adapted for use.

Fig. 2 shows the upper bowl of the coffee maker removed from the lower bowl.

Fig. 3 is a perspective view of my stand for supporting the bowl shown in Fig. 2.

Fig. 4 is a section on the line 4—4 of Fig. 3.

Referring to the drawings, 1 designates the upper bowl, the bottom of which is provided with a neck adapted to fit into the rubber gasket 2 which supports a coaxial brew tube 3. The gasket is adapted to seat in the upper opening of the lower bowl 4 with the brew tube extending downwardly into the confines of the latter. The foregoing construction is typical of a well known type of coffee maker and forms no part of the present invention. It is simply illustrated in order that the uses of this invention may be more clearly understood.

The invention illustrated in Figs. 3 and 4 comprises three coaxial rings 5, 6 and 7, all of which are arranged in parallel horizontal planes and are spaced above one another by upright spacing rods 8 which serve the dual purpose of spacing the rings apart and supporting them above any flat horizontal surface. To preclude marring of such surface, the lower end of each of said rods is provided with a rubber shoe 9. The rings are welded to the upright rods where they contact with one another.

The size and spacing of the two upper rings 5 and 6 are important in this invention. The upper ring 5 must be of a diameter to permit the rubber gasket to readily seat therein, while the lower ring 6 must be of a diameter to properly support a container 10. This container 10 is preferably outwardly flared, as indicated at 10a, to form a lip or flange adapted to seat on the upper surface of the ring 6 and the ring 6 must be of sufficiently smaller diameter than the ring 5 to permit the container 10 to be lifted upwardly through the ring 5 for the purpose of separating the parts for cleaning. The height of the upright rods 8 must be such that the bottom of the receptacle 10 will clear the surface on which the stand rests and the receptacle 10 must be sufficiently deep to accommodate the vertical depth of the brew tube 3 of the upper bowl.

In so proportioning and arranging the parts, I find it convenient to shape the upright rods as shown, so that they flare outwardly in a downward direction to form a relatively large base, so as to render the structure stable and not apt to tip over when supporting the upper bowl. Above the ring 6 these upright rods are flared outwardly and upwardly to accommodate the lip of the receptacle 10 and at the same time properly support the uppermost ring 5. A handle or finger piece, indicated at 11, is preferably welded to one of the upright rods 8. The wire rod from which the stand is made is chromium or nickel plated or coated with lacquer or enamel of any appropriate color.

In use, the stand rests upright on the table top and, when the upper bowl is removed from the coffee maker, it is brought into cooperation with the stand by lowering the upper bowl into seated relation with respect thereto. That is to say, the brew tube 3 is lowered into the receptacle 10 until the gasket 2 enters into and seats within the upper ring 5. When this seating has been accomplished, the stand will support the upper bowl in upright position and any seepage therefrom will be received into and retained by the receptacle 10. The resulting ensemble is neat and pleasing in appearance and will be ornamental in contradistinction to the sloppy appearance incident to the resting of the bowl on a dinner plate as heretofore.

This invention is primarily intended for the purposes stated, although some users have utilized the device as a flower holder when such device was not in use for its primarily intended purpose.

The foregoing detailed description sets forth the invention in its preferred practical form and the invention is to be understood as fully commensurate with the appended claim.

Having thus fully described the invention, what I claim as new and desire to secure by Letters Patent is:

A coffee maker upper bowl stand comprising: a horizontal upper wire ring of a size adapted to embrace the upper bowl rubber washer of a coffee maker intermediate the top and bottom of the latter and form a supporting seat therefor, arcuately spaced apart upright wire legs attached to said upper wire ring for supporting it above a horizontal supporting surface, a horizontal bottom wire ring spaced above the bottom ends of the legs and attached to said legs for arcuately spacing them apart, a drip catching receptacle, and an intermediate horizontal wire ring also attached to said legs and of a size to embrace and form a seat for said drip catching receptacle to support said receptacle free from contact with the supporting surface and at an elevation to receive and house the major portion of the upper bowl brew tube of the coffee maker.

References Cited in the file of this patent

UNITED STATES PATENTS

| Number | Name | Date |
|---|---|---|
| 237,488 | Conway | Feb. 8, 1881 |
| 237,841 | Erhard, Sr. | Feb. 15, 1881 |
| 523,068 | Gaul | July 17, 1894 |
| 967,368 | Grigsby | Aug. 16, 1910 |
| 1,173,210 | Ochs | Feb. 29, 1916 |
| 1,358,593 | Snyder | Nov. 9, 1920 |
| 1,464,652 | Green | Aug. 14, 1923 |
| 2,112,944 | Wolcott | Apr. 5, 1938 |
| 2,174,093 | Perlman | Sept. 26, 1939 |
| 2,281,652 | Wolcott | May 5, 1942 |